(12) United States Patent  (10) Patent No.: US 7,527,321 B1
Benderoth et al.  (45) Date of Patent: May 5, 2009

(54) STATIC DOOR CATCHER

(75) Inventors: Thomas Benderoth, Gummersbach (DE); Gerhard Klein, Pulheim (DE); Joergen Hilmann, Leverkusen (DE); Elvir Vukovic, Köln (DE); Armando Lopes Dos Santos, Köln (DE); Michael Bickenbach, Köln (DE); Brad Staines, Bishops Startford (GB); Issa Pooloo, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/046,653

(22) Filed: Mar. 12, 2008

(51) Int. Cl.
      B60J 5/04 (2006.01)
(52) U.S. Cl. .............................. 296/146.6; 296/187.12; 296/155; 296/146.9
(58) Field of Classification Search ............ 296/187.12, 296/155, 146.6, 146.9, 1.04; 49/371, 502
See application file for complete search history.

(56) References Cited

U.S. PATENT DOCUMENTS

| | | | | |
|---|---|---|---|---|
| 3,788,686 | A * | 1/1974 | Rossie et al. ............. | 296/146.6 |
| 3,819,228 | A * | 6/1974 | Cornacchia .............. | 296/146.9 |
| 3,944,278 | A * | 3/1976 | Takahashi et al. ........ | 296/146.6 |
| 4,488,751 | A * | 12/1984 | Kling ...................... | 296/146.9 |
| 4,544,198 | A * | 10/1985 | Ochiai et al. .............. | 296/155 |
| 4,936,621 | A * | 6/1990 | Shimoda et al. ......... | 296/187.12 |
| 5,029,934 | A * | 7/1991 | Schrader et al. .......... | 296/146.1 |
| 5,224,752 | A * | 7/1993 | Marshall .................. | 296/146.1 |
| 5,297,841 | A * | 3/1994 | Siedlecki ................. | 296/146.6 |
| 5,306,067 | A * | 4/1994 | Hull et al. ................. | 296/146.6 |
| 5,364,157 | A * | 11/1994 | Siedlecki ................. | 296/146.6 |
| 5,431,476 | A * | 7/1995 | Torigaki ................. | 296/187.12 |
| 5,791,723 | A * | 8/1998 | Bell et al. .................... | 296/155 |
| 5,895,088 | A * | 4/1999 | Knott ..................... | 296/187.12 |
| 6,206,455 | B1 * | 3/2001 | Faubert et al. .............. | 296/155 |
| 6,349,989 | B1 * | 2/2002 | Kim ............................ | 296/207 |
| 6,601,910 | B1 * | 8/2003 | Duggan ................. | 296/203.03 |
| 6,793,268 | B1 * | 9/2004 | Faubert et al. ......... | 296/146.12 |
| 6,830,285 | B2 * | 12/2004 | Guillez et al. ............ | 296/146.6 |
| 6,883,856 | B2 * | 4/2005 | Burkat et al. ............. | 296/146.1 |
| 2003/0006625 | A1 * | 1/2003 | Moriyama et al. ....... | 296/146.6 |
| 2005/0023862 | A1 | 2/2005 | Saeki | |
| 2005/0253415 | A1 * | 11/2005 | Bodin et al. ............. | 296/146.6 |
| 2005/0264031 | A1 * | 12/2005 | Mitsui et al. .............. | 296/146.9 |
| 2007/0052259 | A1 * | 3/2007 | Roccato et al. ......... | 296/187.03 |

FOREIGN PATENT DOCUMENTS

| | | |
|---|---|---|
| EP | 0540053 B1 | 2/1992 |
| JP | 200490670 | 3/2004 |
| JP | 2004148877 | 5/2004 |

* cited by examiner

*Primary Examiner*—Jason S Morrow
(74) *Attorney, Agent, or Firm*—Gregory Brown; Brooks Kushman P.C.

(57) ABSTRACT

The invention relates to a vehicle door system with two vehicle doors, with a vehicle body which encloses a passenger compartment and has a common vehicle door opening for the two vehicle doors, wherein, for closing the door opening, the vehicle doors being movable in a manner such that they move from an open position into a closed position and relative to each other and, in the closed position, each are adjacent to the other in a connecting region via a connecting end side, and with impact protection which has stiffening elements for stiffening the vehicle doors in the vehicle opening, and wherein at least one first stiffening element is arranged in the connecting region of the one vehicle door and at least one stiffening element is arranged in the connecting region of the other vehicle door.

14 Claims, 4 Drawing Sheets

STATIC DOOR CATCHER

FIELD OF INVENTION

This invention relates to a reinforcement for a vehicle door system with two vehicle doors.

BACKGROUND OF THE INVENTION

In the case of vehicle door systems of this type, a customary vehicle pillar which divides the vehicle door opening into two smaller vehicle door openings and against which the vehicle doors strike or on which the vehicle doors are mounted is not provided between the vehicle doors. The absent vehicle pillar is, for example, a central pillar or a "B pillar" in the case of a lateral door opening of a customary vehicle body.

A vehicle door system of the prior art is described, for example, in EP 0 540 053 B1 and JP 2004 90670 A, where the stiffening elements of the impact protection each interengage when the vehicle doors are closed. However, this per se obstructs the closing and opening of the vehicle doors or makes it more difficult for them to do so.

Likewise, for the closing of a vehicle door, JP 2004-148877 A also discloses interengaging stiffening elements on the vehicle doors and the vehicle body.

US 20050023862A1 proposes, as impact protection, a body structure which is complicated, since it is configured specifically, in order to absorb and deflect lateral impact forces around the passenger compartment.

The invention is therefore based on the object of providing a vehicle door system of the type mentioned at the beginning with effective impact protection which does not obstruct opening and closing of the vehicle doors or make it more difficult to do so.

SUMMARY OF THE INVENTION

According to an embodiment of the present invention, the object set is achieved in that in the closed position of the vehicle doors, the stiffening elements are arranged spaced apart from each other in a rest position, wherein, in the rest position, the stiffening elements are movable relative to each other by means of the vehicle doors, and wherein, with the introduction of an impact against the vehicle doors, the stiffening elements can be brought counter to each other into an active position in which the stiffening elements interact in a force-transmitting manner in order to stiffen the connecting regions and a transition between the connecting regions. Therefore, according to an embodiment of the present invention, only with the introduction of an impact against the vehicle doors is a connection brought about between the stiffening elements which enables forces and moments of force to be transmitted. In their rest position, the stiffening elements for stiffening the connecting regions are arranged in such a manner that they do not obstruct or influence a movement and closing and opening of the vehicle doors. The merging of the connecting elements in their operative position makes it possible for the stiffening elements to be connected in the manner of a closure and therefore to form a cohesive strength which prevents an impact. Furthermore, an increase in the entire stiffening of the connecting regions can be obtained by connecting the stiffening elements in their active position.

For example, in order to reach their active position, one of the stiffening elements may be accelerated sharply toward the other stiffening element. This acceleration may take place, for example, by means of a directed force such as an explosive mixture, compressed air, stored spring energy or magnetic forces. However, it is preferably provided that in the active position, the stiffening elements bear against each other in a frictional and/or form-fitting manner perpendicular with respect to an outside of the vehicle doors in the Y direction and/or in and/or counter to the closing direction. Forces can therefore be transmitted perpendicularly with respect to the outside of the vehicle doors and/or, perpendicularly with respect thereto, in and/or counter to the closing direction from one vehicle door to the other via the stiffening elements and it can therefore be prevented that the vehicle doors will tear open.

After a lateral impact, those sections of the connecting end sides which are subjected to a particularly heavy load by means of the impact, may buckle to an increased extent. It is therefore proposed that the stiffening elements are arranged in a central section of the connecting end sides, with respect to the longitudinal extent of the connecting end sides. This central region can in general be considered a weak region if, as is customary, in their closed positions the vehicle doors are connected to the vehicle body by a section, with which the connecting end sides of the vehicle doors are adjacent to body parts defining the vehicle opening, by means of fastening devices, such as, for example, snap-type locks, plug-in connections or the like.

It is therefore preferably provided that the central section comprises at least one region in which, in the event of a lateral impact, a temporally first deformation or beginning of the deformation of the vehicle doors is to be anticipated. In the case of a vehicle door curving outward from the passenger compartment, the central region preferably comprises at least one region in which the curvature is at maximum. In the event of a lateral impact in the Y direction perpendicular with respect to the relatively large side surface of the vehicle doors, a temporally first deformation is to be anticipated in the region of the maximum curvature.

The stiffening elements may extend over the entire longitudinal extent of the connecting end sides or over a plurality of sections of the connecting end sides. Possibilities for connecting the stiffening elements in the event of an impact can therefore be provided, said connecting possibilities extending continuously over the entire longitudinal extent of the connecting end sides or over certain sections of the connecting end sides.

The stiffening elements may have an elongated shape. In their longitudinal extent, they can expediently be arranged along the connecting end sides. As a result, for example, extruded profiles can be used as the stiffening elements. The stiffening elements may further have transverse profiles which are suitable for effective interengagement of the stiffening elements in the active position. For this purpose, for example, the principle of a tongue and groove connection can be used in the design of the transverse profile. It is preferably provided that the cross-sectional profiles each have at least one hook comprising a limb and a transverse limb, which is arranged at an angle to the limb and on the limb end side and has limb side surfaces. Furthermore, in the closed position of the vehicle doors, the transverse limb of the first stiffening element can be arranged pointing away from the passenger compartment or essentially away from the passenger compartment, and the transverse limb of the second stiffening element can be arranged pointing toward the passenger compartment or essentially toward the passenger compartment. In addition, the hooks can be arranged such that they overlap in the closed position. The limb side surfaces of the transverse limbs which point towards the vehicle door assigned to them can also face each other. The hooks can therefore overlap in the direction of displacement. According to the invention, the hooks can be arranged at a distance from one another in the direction perpendicular with respect to the outside of the vehicle doors such that, in the rest position, they can be guided past one another during a relative movement in the sliding direction, without touching one another, interlocking or the like. In this case, the distance perpendicular with respect to the sliding direction or perpendicular with respect to the outside of the vehicle doors or in the Y direction is preferably dimensioned in such a manner that the stiffening elements can be guided past one another as closely as possible during the movement of the vehicle doors. In the active position, the hooks may be arranged in a manner such that they are guided toward one another to an extent such that they interlock.

Limbs and transverse limbs of the hooks may each be formed at right angles to one another. In addition, the transverse limb of the respective hook is preferably arranged approximately perpendicular with respect to the outside of the vehicle door assigned to it. In the case of the hook-shaped construction, proposed here, of the stiffening elements and their arrangement in their rest position in the closed position of the vehicle doors, in the event of a lateral impact perpendicular with respect to the outside of the vehicle doors a temporal delay, which is produced by the stiffening elements moving counter to one another from their rest position into their active position, is determined essentially by the length of the transverse limbs. In the event of an impact-induced admission of force in the sliding direction, the lateral delay is determined by the distance of the transverse limbs from that connecting end side of the other vehicle door that is located opposite them in each case. In the event of an impact-induced admission of force counter to the sliding direction, the temporal delay is essentially determined by the distance of the transverse limbs in the sliding direction.

The connecting end sides are advantageously arranged, at least over a region of their cross sections, perpendicular with respect to one of the relatively large side surfaces of the vehicle doors. This enables the same, during an impact loading parallel to the relatively large side surface and perpendicular with respect to the longitudinal extent of the stiffening elements, to be slid in a sheetlike manner with respect to one another and to transmit a force, instead of sliding away on one another, as is highly probable in the case of a customary arrangement of the connecting end sides obliquely with respect to the relatively large side surfaces.

In a customary embodiment, the vehicle doors can each have two body panels, an outer panel and an inner panel, which enclose a cavity and are connected to each other at least at the connecting end sides in the form of connecting flanges. In this case, it is proposed that the connecting flanges can each form the respective hook or at least a transverse limb or a part of the transverse limb of the stiffening element of the associated vehicle door. This measure can also be carried out in the case of vehicle doors with more than two body panels, for example with an additional end panel, which is fitted onto the connecting end side between the outer panel and the inner panel and forms a respective connecting flange with the outer panel and/or the inner panel. The stiffening elements can therefore be preformed together with deep drawing of the body panels and can be formed when the body panels are joined together, thus considerably simplifying the production of the stiffening elements. A customary spot-welding method is preferred as the manner of connection for producing the connecting flanges.

The body panels can be of reinforced design at least in the region of the stiffening elements. This can take place, for example, by means of a double panel and/or a relatively large panel thickness. The stiffening element can also be mounted, preferably in the form of a profiled panel, onto the body panel, and therefore the rigidity of the body panels can contribute to the overall rigidity in the region in which the stiffening elements are mounted.

In a development of the vehicle door system, the impact protection can comprise a third, bar-shaped stiffening element which is preferably arranged along the connecting end side of the first vehicle door and/or the second vehicle door. The rigidity of the connecting end side of the first vehicle door and/or of the second vehicle door can therefore be reinforced. The third stiffening element can be connected to the respective connecting end side by means of a customary joining method, preferably by means of adhesive bonding. The first vehicle door and/or the second vehicle door can each have the third stiffening element. The first and/or the second stiffening element can therefore be fastened on the third stiffening element respectively assigned to their vehicle door. By this means, the first and/or second stiffening element can form, together with the associated third stiffening element, an assembly which increases the overall rigidity of the connecting end sides. In addition, the third stiffening element can form a base for the first or second stiffening element, with it being possible for the assembly to already be put together in a preinstallation step. The third stiffening element can preferably be manufactured from a polyamide. This plastic has the advantage that it is light and has sufficient strength which can be controlled by the production process of the polyamide. The third stiffening element can additionally be formed by glass or carbon fibers in the form of glass-fiber reinforced plastic (GFRP) or in the form of carbon-fiber reinforced plastic (CFRP), the respective fibers preferably extending in the longitudinal direction of the third stiffening element. The third stiffening element can be designed as a solid body or as a hollow profile with a closed or an open profile. The third stiffening element is preferably produced by extrusion. The third stiffening element can also be produced from metal, preferably from aluminum, and then preferably by means of extrusion.

In the case of an open, preferably U-shaped hollow profile, the third stiffening element can simultaneously form the first and/or the second stiffening element in each case. In this case, in the rest position of the stiffening elements, the U profiles face one another by means of their free transverse limbs and are arranged at a distance from one another and, in the active position, can engage in one another in such a manner that the transverse limbs can come laterally into contact during displacement counter to the direction of travel, sit in each case on the other stiffening element during displacement toward the passenger compartment and can therefore transmit deformation forces in said directions from one vehicle door to the other vehicle doors.

In a preferred development of the vehicle door system, the two vehicle doors can be designed as sliding doors which are each movable by means of guide rails on a nonlinear displacement path relative to the vehicle body. In this case, a first guide rail for the first vehicle door, which guide rail is at the rear in the closing direction of the first vehicle door, can run in a section which is at the rear in the closing direction approximately parallel to a relatively large side surface of the first vehicle door in the closed position. Furthermore, a second guide rail for the second vehicle door, which guide rail is at the rear in the closing direction of the second vehicle door, can run in a section which is at the rear in the closing direction with a relatively large amount of distance toward the passenger compartment. In this embodiment of the vehicle doors as sliding doors, the first stiffening element is preferably arranged on the first sliding door and the second stiffening element is preferably arranged on the second sliding door. By this means, the first stiffening element, with movement of the first sliding door supporting it on the last section of the displacement path into the closed position, can be moved approximately parallel or parallel to the relatively large side surface of the first vehicle door in the closed position and can therefore be pushed with respect to the outside under the second sliding door when the latter is in its closed position. As frequently customary, this requires a stepped cross section of the connecting end sides, which, in the closing direction of the first vehicle door, is guided from the outside of the respectively associated vehicle door with an amount of displacement in the direction toward the passenger compartment. The same also applies to the further embodiment of the vehicle doors that has yet to be described. The second stiffening element on the second vehicle door, which can be pivoted on the rear section of its guide rail into the door opening with a relatively large amount of displacement toward the passenger compartment, is correspondingly pivoted toward the first stiffening element of the first vehicle door, which is in the closed position, without the two stiffening elements touching or interengaging in their respective position in the closed position of the vehicle doors.

In another embodiment of the vehicle door system, the second vehicle door can be designed as a pivoting door which can be fastened to a frame part of the vehicle body in a manner such that it can pivot about a pivot axis perpendicular with respect to its pivoting closing direction. As in the previous exemplary embodiment, the first vehicle door, which is designed as a sliding door, is movable by means of guide rails on a nonlinear displacement path relative to the vehicle body. In this case, a guide rail which is at the rear in the closing direction can run, in a section which is at the rear in the closing direction of the sliding door, approximately parallel to a relatively large side surface of the first vehicle door in the closed position. The first stiffening element is preferably arranged on the sliding door and the second stiffening element is preferably arranged on the pivoting door. Here too, as in the preceding example, in which the two vehicle doors are designed as sliding doors, the first stiffening element can therefore be pushed on the rear guide rail approximately parallel or parallel to a relatively large side surface in the first vehicle door and the sliding door can therefore be pushed with respect to the outside under the pivoting door, which is in the closed position, and therefore under the second stiffening element. Likewise, the second stiffening element can be pivoted by means of the pivoting door toward the first stiffening element on the sliding door in the closed position, with the two stiffening elements also being arranged here with respect to each other in the closed position of the vehicle doors in such a manner that they cannot touch or interlock in their defined rest position, but preferably are arranged at a minimal distance from each other.

The present invention is explained in more detail below with reference to a number of exemplary embodiments. The invention is reproduced here in the drawing in a highly schematized manner such that the principle on which it is based can become clear. In the drawing:

BRIEF DESCRIPTION OF THE DRAWINGS

FIG. 6 shows a perspective cross-sectional view of a second embodiment of the vehicle door system with an additional third stiffening element in a cross-sectional profile similar to the cross-sectional profile A-A shown in FIG. 1a.

DETAILED DESCRIPTION

Figure 1:
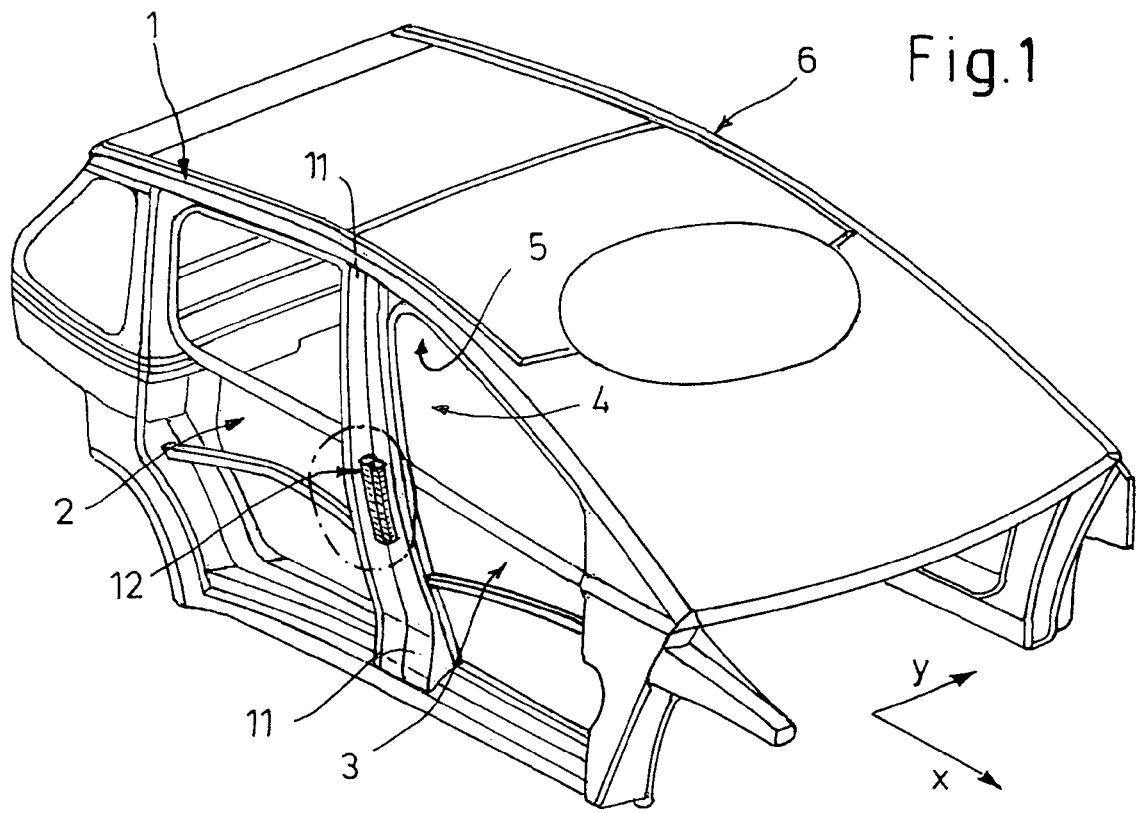
FIG. 1 shows a perspective illustration of a first embodiment of a vehicle door system.

FIGS. 1 to 5 show, in various views and partial views, a first embodiment of a vehicle door system 1 with two vehicle doors, a first vehicle door 2 and a second vehicle door 3. The vehicle doors 2, 3 are movable into a common vehicle door opening 4 of a vehicle body 6 which encloses a passenger compartment 5. The vehicle door opening 4 is arranged to the side of the vehicle body 6. It does not have a central pillar or B pillar against which the two vehicle doors 2, 3 can strike.

In order to close the vehicle door opening 4, the vehicle doors 2, 3 are movable such that they move from an open position (not illustrated here) into a closed position (illustrated in the figures) and relative to each other, with the vehicle doors 2, 3, in the closed position, each being arranged lying opposite each other in a connecting region 7 with a connecting end side 8. In the exemplary embodiment shown here of the vehicle door system 1, the first vehicle door 2 is designed as a sliding door Sb which is arranged at the front in the direction of travel x. As reproduced schematically in FIG. 2, the sliding door Sb can be displaced by means of guide rails 9 on a nonlinear displacement path w, with respect to the vehicle body 6, in a closing direction s from the open position into the closed position in the direction of travel x, and, of the guide rails 9, only a guide rail 10 which is at the rear in the closing direction being illustrated in FIG. 2. The second vehicle door 3 is designed as a pivoting door Sw which can be pivoted about a pivot axis a on the vehicle body 6 and in a pivoting closing direction Sw into the vehicle door opening 4.

The vehicle doors 2, 3 are each connected in an upper and lower section of their connecting region 7 to the vehicle body 6 by means of a connecting device 11. Furthermore, the vehicle door system 1 has impact protection 12 with stiffening elements, a first stiffening element 13 and a second stiffening element 14, for stiffening the vehicle doors 2, 3 in the vehicle door opening 4, which stiffening elements, as explained in more detail further below, only deploy their full effectiveness in the event of an impact. The first stiffening element 13 is positioned on the connecting end side 8 of the first vehicle door 2, and the second stiffening element 14 is positioned on the connecting end side 8 of the second vehicle door 3. The stiffening elements 12, 13 have an elongated form and, in their longitudinal extent, are arranged along the connecting end sides 7. The two stiffening elements 13, 14 are arranged lying opposite each other and half way up in a central region of the vehicle doors 2, 3, in which, in the event of a lateral impact perpendicular with respect to the direction of travel x, a temporal first deformation of the vehicle doors 2, 3 is to be anticipated. As can be gathered in particular from FIG. 1a, an enlargement of a detail from FIG. 1, the two stiffening elements 13, 14 are matched to the contour of the respective connecting end side 8.

Figure 2:
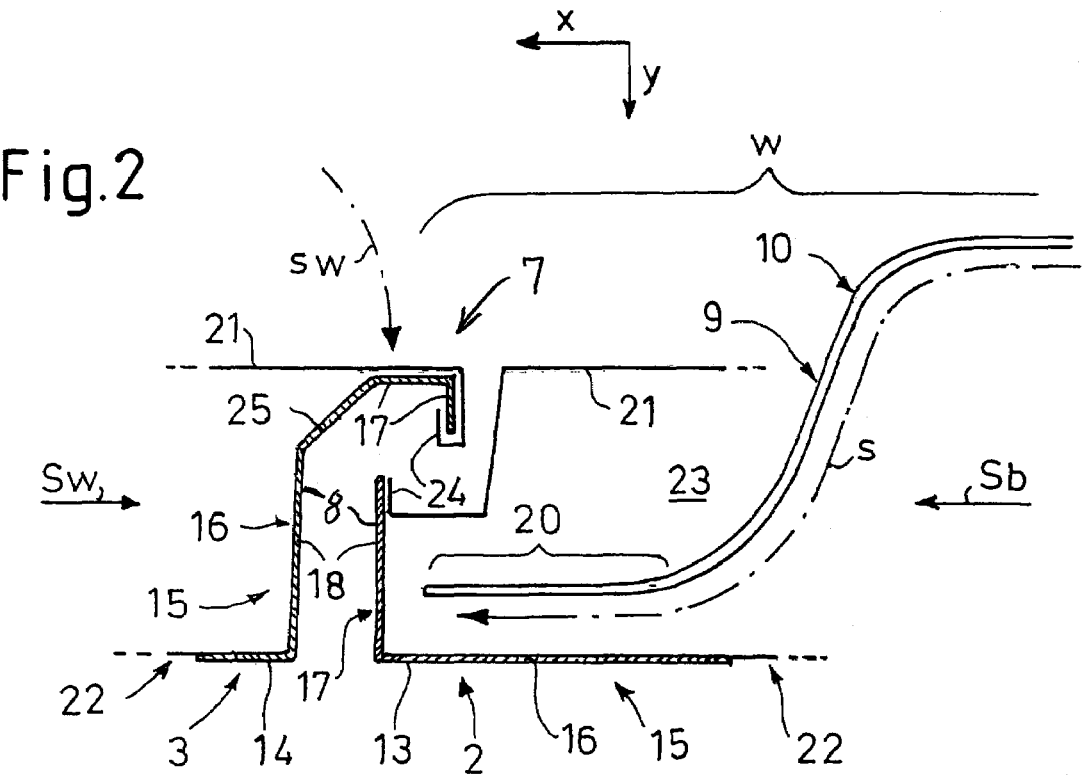
FIG. 2 shows a schematized cross-sectional profile A-A according to FIG. 1a, FIG. 3 shows the schematized cross-sectional profile according to FIG. 2 in accordance with a first loading form.

FIG. 2 shows a highly schematic cross-sectional view according to the cross-sectional profile A-A in FIG. 1. In the closed position of the vehicle doors 2, 3 in FIG. 2, the stiffening elements 13, 14 are in a rest position in which the stiffening elements 13, 14 are arranged at a distance from each other and in which no deformation as a consequence of an impact or the like has yet taken place.

The cross-sectional profiles of the two stiffening elements 13, 14, which profiles are reproduced schematically in FIG. 2, essentially have a hook 15 with a limb 16 and a transverse limb 17, which is arranged at right angles to the limb 16 and on the limb end side and has limb side surfaces 18. In this case, the stiffening elements 13, 14 are arranged such that they overlap in the closed position of the vehicle doors 2, 3. Furthermore, the two transverse limbs 17 are oriented perpendicular with respect to one of the relatively large side surfaces 19 of the vehicle doors 2, 3 or in the y direction in the closed position of the vehicle doors 2, 3. The vehicle doors 2, 3 are each formed from an outer panel 21 and an inner panel 22 which enclose a cavity 23 and are connected to each other with a connecting flange 24 being formed. In this exemplary embodiment, the connecting flange 24 in turn forms, in the case of the sliding door Sb, a part of the transverse limb 17 and, in the case of the pivoting door Sw, additionally part of the limb 16. The hook 15 of the pivoting door Sw has a profile with a double transverse limb 17 for engaging over and into the hook 15 of the sliding door Sb, with a limb section 25 which runs obliquely being provided in order to increase the strength.

The rear guide rail 10 has a section 20 which is at the rear in the closing direction s and is arranged approximately parallel to the relatively large side surface 19 of the first vehicle door 2 in the closed position. This has the effect that the first vehicle door 2 can be guided by its connecting region 7 by means of the rear section 24 of the rear guide rail 10 correspondingly parallel to a relatively large side surface 19 into the closed position and, by means of its first stiffening element 13, can engage below the second stiffening element 14 on the pivoting door Sw in the closed position without the two stiffening elements 13, 14 being able to touch each other or interlock. Likewise, the stiffening elements 13, 14 also cannot touch each other or interlock during a pivoting of the pivoting door Sw if the first vehicle door 2 is already in the closed position, since, with the closing of the pivoting door Sw, said vehicle door is moved in the direction of the passenger compartment toward the first stiffening element. It is advantageous if, as explained in detail further below, the connecting end sides 8 are arranged in a predominantly stepped manner and at right angles to the direction of travel x.

FIGS. 3 to 5 show, again in highly schematized form for the sake of clearness, by way of example three different loading situations as a consequence of an impact and its effects on the cross section shown in FIG. 4, with there being more discussion of possible displacements of the two connecting regions 7 of the vehicle doors 2, 3 and less of actual deformation processes in the vehicle doors 2, 3. In this connection, the original position of the connecting region 7 are illustrated by dashed lines and the position of the connecting region 7 into which they are displaced as a consequence of the impact are illustrated by solid lines.

Figure 3:
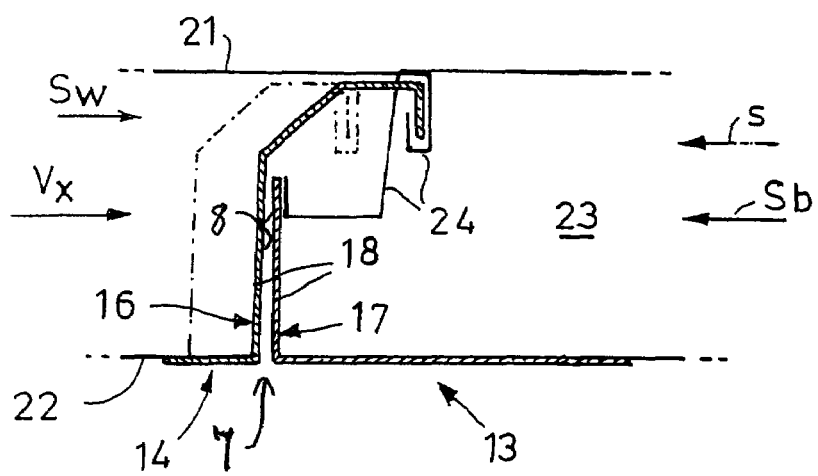

In FIG. 3, a deformation force VX takes place counter to the direction of travel x or the closing direction s of the sliding door and by means of which the pivoting door Sw is pressed against the sliding door Sb. In the process, the stiffening elements 13, 14 are displaced into an active position in which they can transmit deformation forces from the pivoting door Sw to the sliding door. A similar loading situation would arise if force were introduced in the direction of travel due to, for example, another vehicle colliding with the present vehicle. Owing to the stepped cross-sectional profile of the connecting end sides of the sliding door Sb, the orientation of the transverse limb 17 of the hook 15 of the pivoting door Sw and the largely parallel orientation, designed perpendicular with respect to the direction of travel x, of the connecting end sides 8, upon the impact connecting end sides 8 bear against each other, by means of the limb 16 of the pivoting door Sw and the transverse limb 17 of the sliding door Sb, without sliding away on each other. The assembly between the vehicle doors 2, 3 is therefore stiffened in the impact and accordingly a deformation force can be transmitted from one vehicle door to the other.

Figure 4:
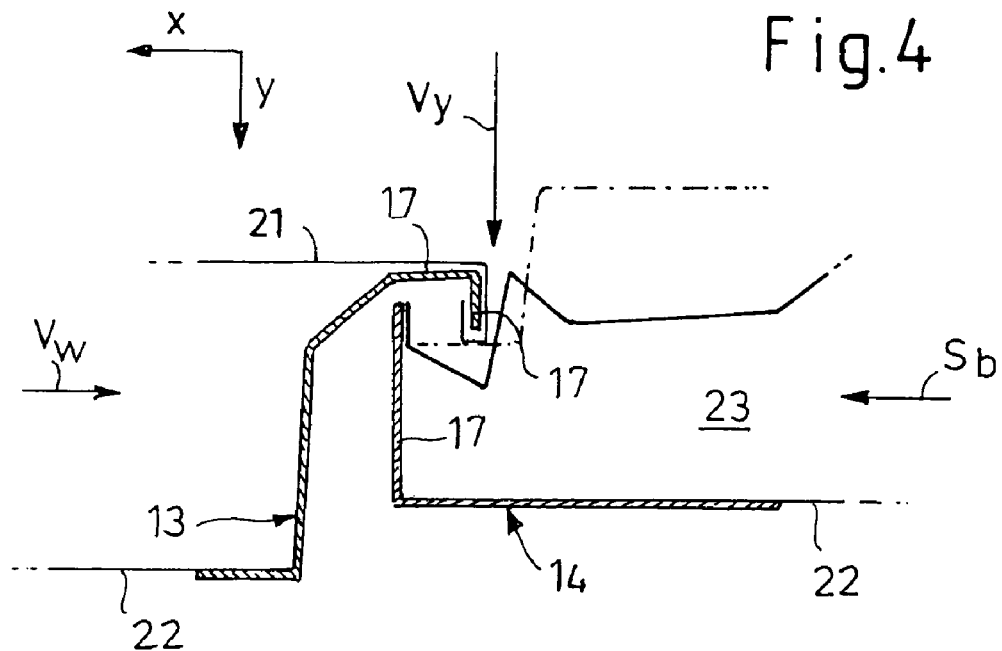
FIG. 4 shows the schematized cross-sectional profile according to FIG. 2 in accordance with a second loading form.

In FIG. 4, deformation force Vy is introduced perpendicular with respect to the relatively large side surface or in the Y direction and toward the passenger compartment 5 in the closing direction s of the sliding door Sb, by means of which the pivoting door Sw is pressed against the sliding door Sb. At the same time, the stiffening elements 13, 14 are pressed against each other in the active position. The two vehicle doors 2, 3 interlock by said stiffening elements interengaging via the hooks 15, and therefore tearing open at the connecting end sides 8 with a gap being formed toward the passenger compartment 5 is thereby avoided.

Figure 5:
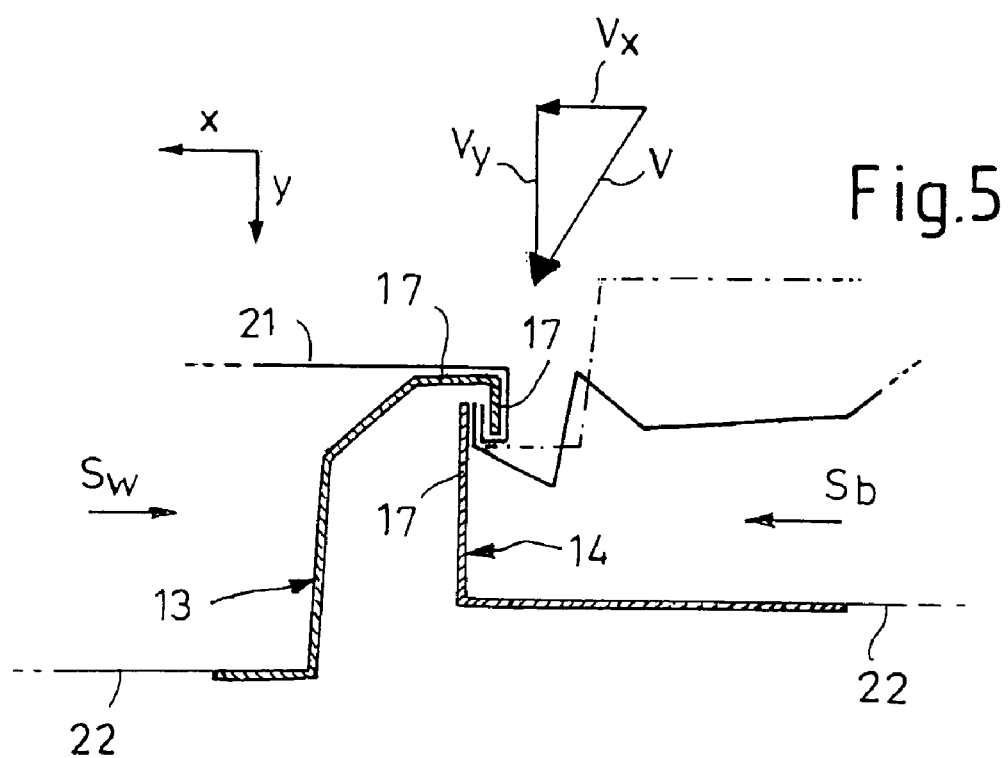
FIG. 5 shows the schematized cross-sectional profile according to FIG. 2 in accordance with a third loading form.

FIG. 5 reproduces a loading situation in which a deformation force V acts obliquely on the relatively large side surface 19 with a component VX in the X direction and a component Vy in the y direction, i.e. toward the passenger compartment 5. By this means, the stiffening elements 13, 14 are brought into their active position by being pressed against each other here, in a manner identical to the loading situation according to FIG. 4, and additionally also interlocking in such a manner that the transverse limbs 17 of the two stiffening elements 13, 14 bear in a sheetlike manner against each other. Tearing open of the vehicle doors 2, 3 in the vehicle door opening 4 is therefore also prevented here.

Figure 1A:
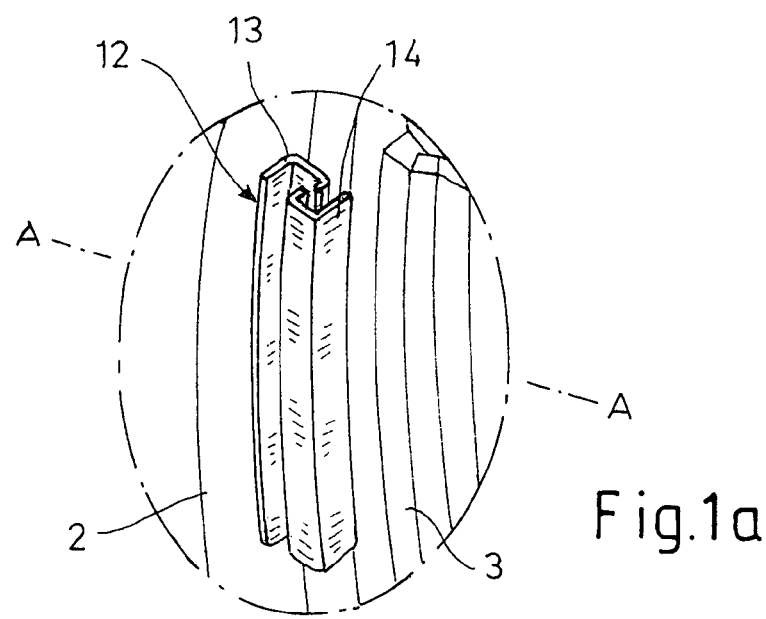
FIG. 1a shows a detail according to FIG. 1.
Figure 6:
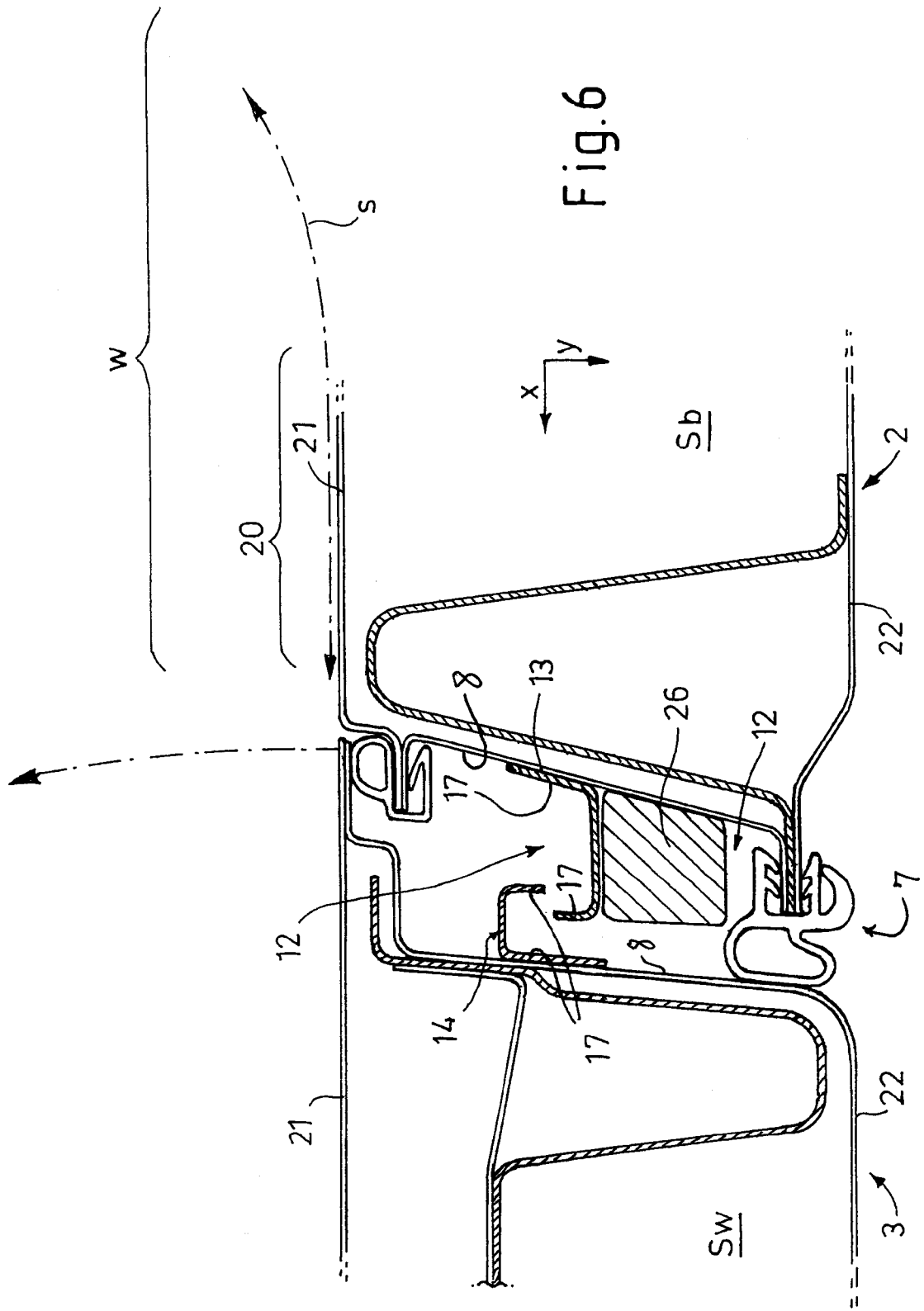

FIG. 6 shows a perspective cross-sectional view of a second embodiment of the vehicle door system 1 in a cross-sectional profile, similar to the cross-sectional profile A-A shown in FIG. 1a, but only with a detail of the vehicle door system 1 with the connecting regions 8 of the vehicle doors 2, 3 being reproduced. The impact protection 12 is provided with an additional stiffening element, a third stiffening element 26. The third stiffening element 26 is of bar-shape design, is fastened on the connecting end side 8 of the sliding door Sb and extends, which cannot be seen explicitly here in the drawing, over the entire length of the connecting end side 8. The third stiffening element 26 acts, in accordance with the prior art, in a similar manner to a B pillar, not provided here. To save weight, the third stiffening element 26 is composed of a polyamide, is designed as a solid body and is adhesively bonded to the connecting end side. The first stiffening element 13 is advantageously mounted on the third stiffening element 26 and, in this exemplary embodiment, is not partially formed from a connecting flange, but rather from a profiled panel. In this case, the first stiffening element 13 has a U profile with two transverse limbs 17 which point away from the passenger compartment 5 in the Y direction.

The second stiffening element 14 is in the rest position at a distance thereto, and its transverse limb 17 is guided in the active position (not shown here) between the transverse limb 17 of the first stiffening element 13, and therefore, during displacement in the y direction toward the passenger compartment and/or in or counter to the direction of travel as a consequence of a deformation caused by an impact or the like, the second stiffening element 14 always abuts against the first stiffening element 13 or interlocks with the same such that a tearing open of the vehicle doors 2, 3 at the connecting regions 7 is avoided.

What is claimed is:

1. A door system for a vehicle having a vehicle body that encloses a passenger compartment, the door system comprising:

a first vehicle door and a second vehicle door that are movable into a common vehicle door opening in the vehicle body, the vehicle doors being movable from an open position to a closed position in which vehicle doors are arranged lying opposite to each other in a connecting region;

a plurality of stiffening elements for stiffening the vehicle doors in the vehicle door opening, wherein a first stiffening element is arranged in a connecting region of the first vehicle door and a second stiffening element is arranged in the connecting region of the second vehicle door, the stiffening elements being spaced apart when the vehicle doors are closed and in a rest position, in the event of an impact against the vehicle door in the closed position the stiffening elements move to an active position to interact in a force-transmitting manner to stiffen the vehicle doors in the connecting region, and further wherein the stiffening elements have cross-sectional profiles that are suitable for effective interengagement of the stiffening elements in the active position, wherein the cross-sectional profiles each have at least one hook comprising a limb and a transverse limb, which is arranged on a limb end side at an angle to the limb and has a plurality of limb side surfaces, the transverse limb of the first stiffening element is arranged to point essentially away from the passenger compartment and the transverse limb of the second stiffening element is arranged to point essentially toward the passenger compartment with the hooks being arranged to overlap in the closed position.

2. The vehicle door system as claimed in claim 1, wherein, in the active position, the stiffening elements bear against each other in a frictional and form-fitting manner perpendicular with respect to an outside of the vehicle doors in a transverse vehicle direction and counter to the closing direction.

3. The vehicle door system as claimed in claim 1, wherein the stiffening elements are arranged in a central section in the connecting region, with respect to the longitudinal extent of the connecting region, and such that they lie opposite each other in the rest position.

4. The vehicle door system as claimed in claim 3, wherein the central section comprises at least one region in which, in the event of a lateral impact, a temporally first deformation or a beginning of the deformation of the vehicle doors is to be anticipated.

5. The vehicle door system as claimed in claim 3, wherein, in the case of a vehicle door having an outward curvature from the passenger compartment, the central section comprises at least one region in which the outward curvature is at maximum.

6. The vehicle door system as claimed in claim 1, wherein the stiffening elements have an elongated shape and, in their longitudinal extent, are arranged in the connecting region.

7. The vehicle door system as claimed in claim 1, wherein the limb and transverse limb of the hooks are each formed at right angles to each other, and wherein the transverse limb is arranged approximately perpendicularly with respect to an outer surface of the vehicle door to which the transverse limb is attached.

8. The vehicle door system as claimed in claim 1, wherein the vehicle doors each have an outer panel and an inner panel that enclose a cavity and are connected to each other by a plurality of connecting flanges outside the cavity, and wherein the connecting flanges form the respective hook or at least the transverse limb of one of the vehicle doors.

9. The vehicle door system as claimed in claim 8, wherein the body panels are reinforced at least in the region of the stiffening elements.

10. The vehicle door system as claimed in claim 1, wherein a bar-shaped stiffening element is arranged in the connecting region of the first vehicle door and of the second vehicle door, and wherein the bar-shaped reinforcing element is manufactured from a polyamide, or from GFRP or CFRP.

11. The vehicle door system as claimed in claim 10, wherein the first stiffening element is reinforced by the bar-shaped stiffening element.

12. A door system for a vehicle having a vehicle body that encloses a passenger compartment, the door system comprising:

a first vehicle door and a second vehicle door that are movable into a common vehicle door opening in the vehicle body, the vehicle doors being movable from an open position to a closed position in which vehicle doors are arranged lying opposite to each other in a connecting region;

a plurality of stiffening elements for stiffening the vehicle doors in the vehicle door opening, wherein a first stiffening element is arranged in a connecting region of the first vehicle door and a second stiffening element is arranged in the connecting region of the second vehicle door, the stiffening elements being spaced apart when the vehicle doors are closed and in a rest position, in the event of an impact against the vehicle door in the closed position the stiffening elements move to an active position to interact in a force-transmitting manner to stiffen the vehicle doors in the connecting region; and wherein a third, bar-shaped stiffening element is arranged along the connecting end side of the first vehicle door and of the second vehicle door, and wherein the third reinforcing element is manufactured from a polyamide, or from GFRP or CFRP.

13. A door system for a vehicle having a vehicle body that encloses a passenger compartment, the door system comprising:

a first vehicle door and a second vehicle door that are movable into a common vehicle door opening in the vehicle body, the vehicle doors being movable from an open position to a closed position in which vehicle doors are arranged lying opposite to each other in a connecting region;

a plurality of stiffening elements for stiffening the vehicle doors in the vehicle door opening, wherein a first stiffening element is arranged in a connecting region of the first vehicle door and a second stiffening element is arranged in the connecting region of the second vehicle door, the stiffening elements being spaced apart when the vehicle doors are closed and in a rest position, in the event of an impact against the vehicle door in the closed position the stiffening elements move to an active position to interact in a force-transmitting manner to stiffen the vehicle doors in the connecting region, wherein at least one vehicle door is a sliding door which is movable by means of a guide rail on a nonlinear displacement path relative to the vehicle body.

14. The vehicle door system as claimed in claim 13, wherein the first stiffening element is arranged on the first sliding door.

* * * * *